United States Patent [19]

Blackmon et al.

[11] Patent Number: 5,309,512
[45] Date of Patent: May 3, 1994

[54] CALL WAITING DELUXE FEATURE

[75] Inventors: La Sheral Blackmon, Naperville; James R. Blakley, Chicago; Cheryl J. Kohn, Naperville; Brenda L. Sermersheim, Aurora; Kathleen C. Whildin, Sugar Grove; Diane M. Zurbriggen, Naperville, all of Ill.

[73] Assignee: AT&T Bell Laboratories, Murray Hill, N.J.

[21] Appl. No.: 922,439

[22] Filed: Jul. 29, 1992

[51] Int. Cl.$^5$ .................. H04M 3/42; H04M 1/64; H04M 1/56
[52] U.S. Cl. .................. 379/210; 379/67; 379/88; 379/142; 379/211; 379/215; 379/212
[58] Field of Search .......... 379/67, 88, 89, 210, 379/211, 215, 127, 212, 142

[56] References Cited

U.S. PATENT DOCUMENTS

| | | | |
|---|---|---|---|
| 4,661,975 | 4/1987 | Brecher | 379/215 |
| 4,785,408 | 11/1988 | Britton et al. | 379/88 X |
| 5,007,076 | 4/1991 | Blakley | 379/67 |

OTHER PUBLICATIONS

A-I-Net TM Service Circuit Node (SCN) System Description, 270-730-010, Issue 1, Apr. 1992.
A-I-Net TM Service Circuit Node (SCN) Product Technical Specifications Release 1, 270-730-011, Issue 1, Apr. 1992.
5ESS TM Switch Feature Handbook, p. 19.

Primary Examiner—James L. Dwyer
Assistant Examiner—Harry S. Hong
Attorney, Agent, or Firm—Ross T. Watland

[57] ABSTRACT

A call waiting deluxe method where a switching system forwards calls to a service node that provides specialized call processing, e.g., processing requiring text-to-speech, to a number of switching systems without requiring modification of the hardware design of those systems. Only calls to busy called stations are forwarded to the service node using a call forwarding-busy line feature to avoid unnecessary delays and excessive service node traffic for normal calls. The service node uses the same directory number that was initially dialed for the call, in invoking a call waiting-originating feature which takes precedence over the call forwarding-busy line feature and results in the transmission of a call waiting signal to the called station. The service node obtains the calling party name from a database and responds to a flash signal from the called station by speaking the calling party name to the called party. The service node also transmits an announcement to the called station including a number of call handling options, and responds to a signal from the called station defining one of the options by controlling handling of the incoming call in accordance with the defined option.

16 Claims, 6 Drawing Sheets

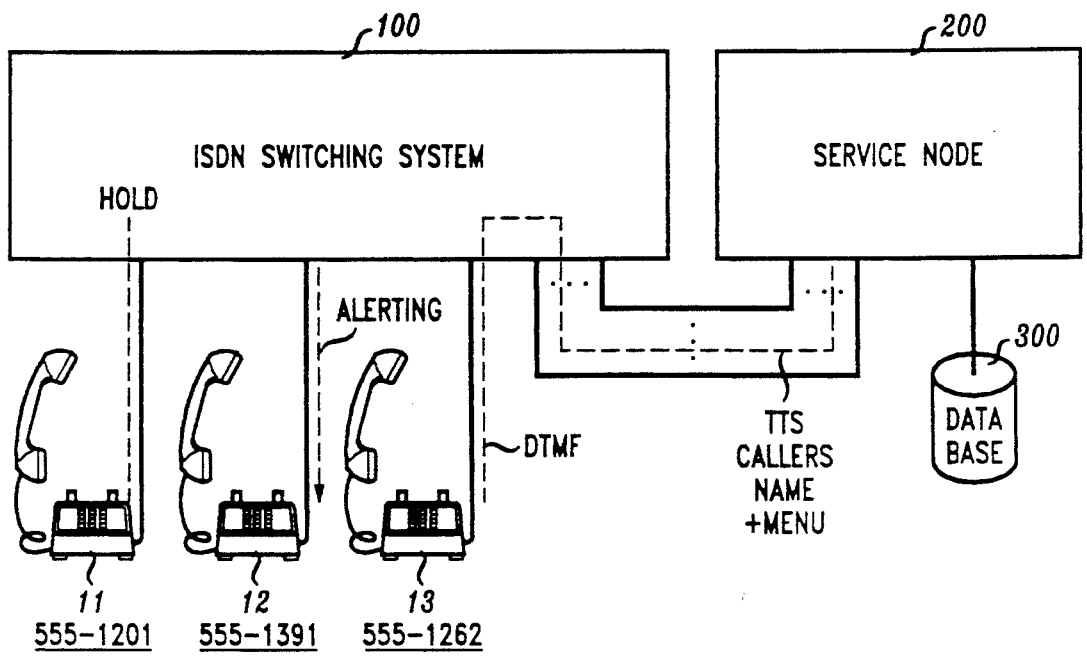
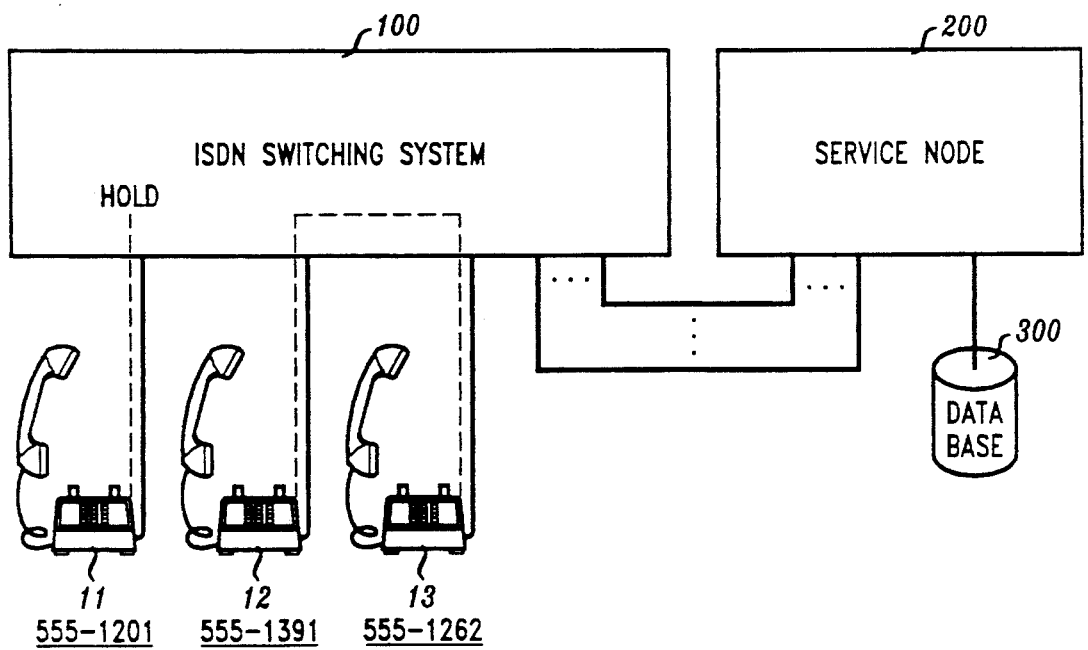

CALL WAITING DELUXE FEATURE

TECHNICAL FIELD

This invention relates to telecommunications.

BACKGROUND AND PROBLEM

As stored program-controlled switching systems have evolved, a wide variety of useful features have been developed to extend the communication capabilities such systems provide. Incoming calling line identification, a feature that displays the caller's number for incoming calls to a called customer station, allows selective acceptance of certain calls based on the calling number while other calls are either not answered or are routed to a message center. The feature is implemented by transmitting the calling line identification to the called customer station in a data message—for example, to an analog station during a silent interval between ringing or to an integrated services digital network (ISDN) station in the out-of-band D-channel used for call control signaling. Since customers typically remember only a few, frequently called telephone numbers, a related feature that provides a display of the caller name is substantially more useful to customers in deciding whether to accept a call. With a known call waiting feature where a caller-identifying data message is transmitted out-of-band, as for an ISDN station, a customer already engaged in an ongoing telephone conversation is informed of the caller identity for a second call that is coming in. Although such features provide customers with much greater control over their telephone communications, conventional analog stations, which represent a large majority of the customer stations in use today, are not equipped to either process or display data messages. In addition, modification of the normal human response of answering a ringing telephone, such that a customer glances at a display to determine caller identity before answering, is difficult particularly for customers that use the features only infrequently.

U.S. Pat. No. 5,007,076 issued to J. R. Blakley on Apr. 9, 1991, discloses an enhanced call waiting feature implementation for use with conventional analog station sets. When a called station is busy, a call waiting signal is transmitted to the called station. If the called station flashes, a communication path between the previous caller and the called station is disconnected and the calling party name is spoken to the called station using text-to-speech. If the called party chooses to take the new call after learning the calling party name, the called station transmits a DTMF digit or allows the expiration of a predetermined time period without signaling. In response a communication path is completed between the second caller and the called station. A problem with the disclosed Blakley implementation relates to the cost and difficulty in integrating text-to-speech technology into existing switching system designs as well as providing such technology in each switching system which serves customers desiring the enhanced call waiting feature.

Solution

This problem is solved and a technical advance is achieved in accordance with the principles of the invention in an exemplary call waiting deluxe method where a switching system forwards calls to a service node that provides specialized call processing, e.g., processing requiring text-to-speech, to a number of switching systems without requiring modification of the hardware design of those systems. Advantageously, only calls to busy called stations are forwarded to the service node using a call forwarding-busy line feature to avoid unnecessary delays and excessive service node traffic for normal calls. The service node uses the same directory number that was initially dialed for the call, in invoking a call waiting-originating feature which, importantly, takes precedence over the call forwarding-busy line feature and results in the transmissions of a call waiting signal to the called station. The service node obtains the calling party name from a database and responds to a flash signal from the called station by speaking the calling party name to the called party. The service node also transmits an announcement to the called station including a number of call handling options, and responds to a signal from the called station defining one of the options by controlling handling of the incoming call in accordance with the defined option. The options include transferring the incoming call to a voice message system, placing the incoming call on hold, transmitting a busy message, having the switching system continue to transmit an audible alerting signal, and accepting the incoming call.

A method in accordance with the invention is used in an arrangement comprising a switching system and a service node for specialized call processing. In response to an incoming call from a calling communication station to said switching system for a called communication station, it is determined whether the called station is busy on another call. Upon determining that the called station is busy on another call, the incoming call is forwarded to the service node. In response, the service node effects a search for information associated with the calling station. The service node causes a call waiting signal to be transmitted to the called station. Thereafter, the switching system responds to receipt of a predefined signal from the called station by disconnecting a communication path between a calling communication station for the other call and the called station. After the path is disconnected, the service node transmits speech signals, generated from the information obtained during the search, to the called station.

Illustratively, after the speech signals are transmitted and in response to receipt of a prespecified signal, e.g., a dual-tone multi-frequency (DTMF) digit or expiration of a specified time period without receiving signaling, the service node transfers the incoming call to the called station. The called station has a call forwarding-busy line feature assigned to it by the switching system and does not have a call waiting feature assigned to it by the switching system. The called station has a call waiting deluxe feature assigned to it by the service node. The call forwarding-busy line feature may be canceled on a per call basis. The service node invokes a call waiting-originating feature of the switching system, e.g., dial call waiting, and dials a directory number of the called station—the same directory number that was initially dialed for the incoming call. The call waiting-originating feature takes precedence over the call forwarding-busy line feature. At most two calls to the called station can be forwarded to the service node at the same time. The dial call waiting feature of the switching system may be invoked for only one call to the called station at a time. During the various specialized processing steps, an audible alerting signal is transmitted to the caller.

DRAWING DESCRIPTION

FIGS. 2–7 are a sequence of diagrams illustrating steps in a call scenario for the call waiting deluxe feature.

DETAILED DESCRIPTION

Figure 1:
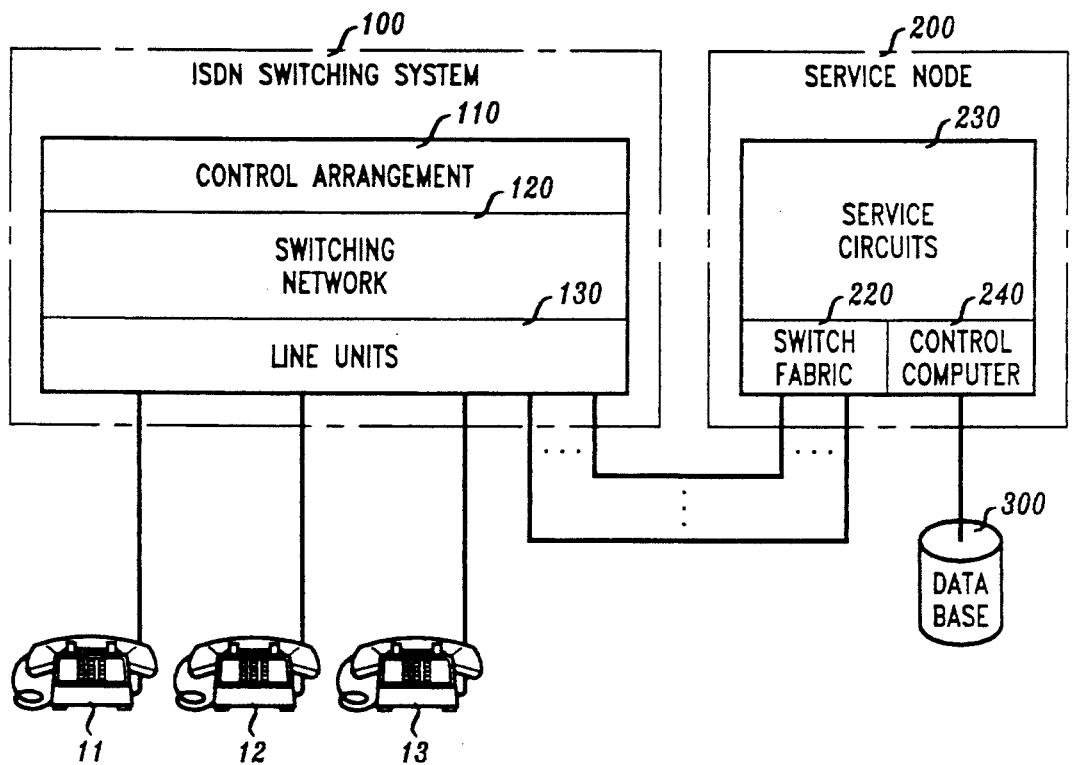
FIG. 1 is a block diagram of an exemplary arrangement in which the call waiting deluxe feature of the present invention is implemented.

An exemplary call waiting deluxe feature in accordance with the invention is implemented in an arrangement comprising an ISDN switching system 100, a service node 200, and a database 300 (FIG. 1). ISDN switching system 100 is of the type disclosed in U.S. Pat. No. 4,592,048 issued to M. W. Beckner et al. on May 27, 1986. Service node 200 is of the type disclosed in the AT&T A-I-Net TM Service Circuit Node (SCN) Product Technical Specifications Release 1 both of Apr. 15, 1992. System 100 comprises a control arrangement 110, a switching network 120, and line units 130 and is connected to analog station sets 11, 12, and 13 as well as other station sets not shown. System 100 is also connected to service node 200 by a number of ISDN basic rate interface (BRI) lines. Service node 200 comprises a control computer 240, a switch fabric 220, and service circuits 230. Service circuits 230 provide the following capabilities: 1) digit collection, 2) tone detection/generation, 3) FAX receipt, storage, and transmittal, 4) voice recording, storage, and playback, 5) text-to-speech (TTS) announcements, 6) call setup through the switch fabric 220, 7) conference bridging, 8) transferring a call to a second party, and 9) returning call control to system 100. Database 300 provides a reverse white pages directory which returns a calling party name when a calling party number is provided. Although not shown in FIG. 1, service node 200 may be connected to a plurality of ISDN switching systems in addition to system 100.

The call waiting deluxe feature of the present invention is described with reference to a call scenario illustrated in FIGS. 2–7. Station 13 is assigned a call forwarding-busy line feature by system 100 and is not assigned a call waiting feature by system 100. However, station 13 is assigned a call waiting deluxe feature by service node 200. The call waiting deluxe feature is a feature where the calling party name is spoken to the called party.

Figure 2:
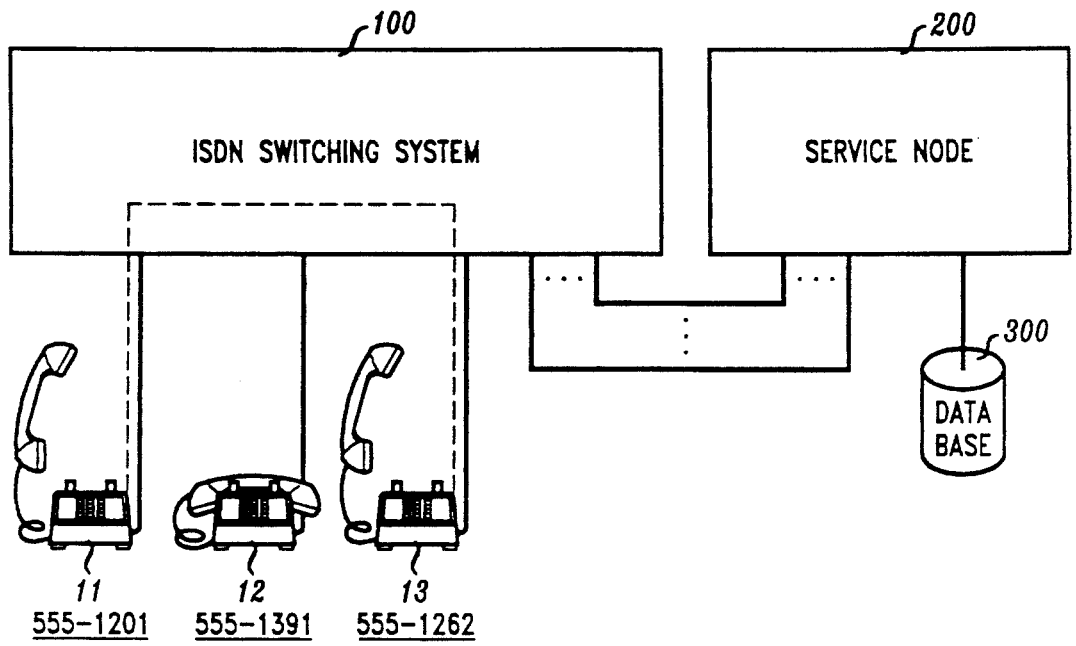
Figure 3:
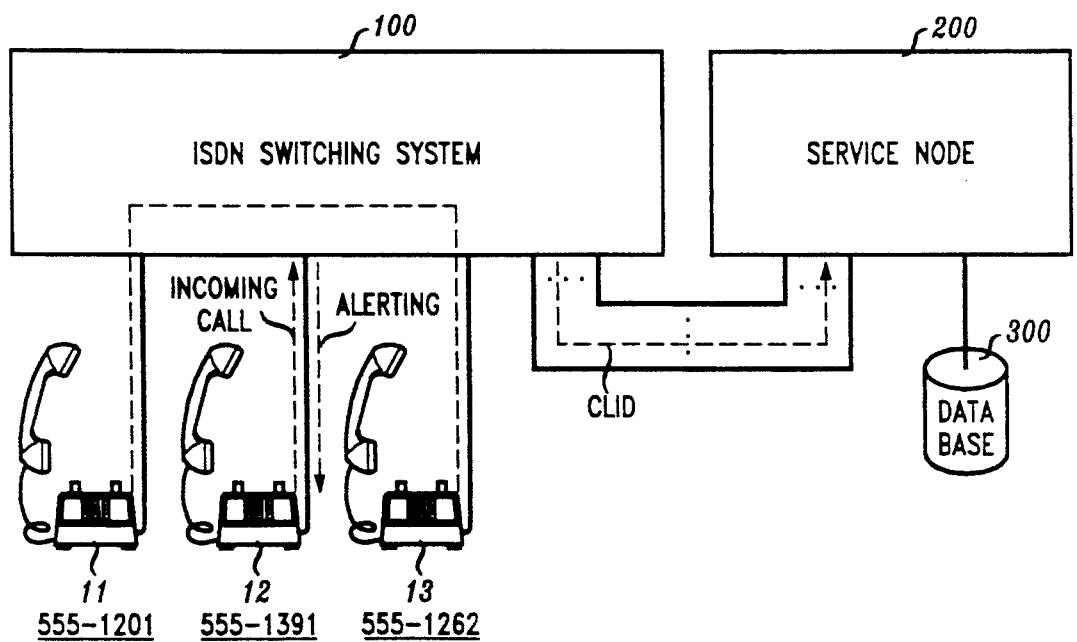
Figure 4:
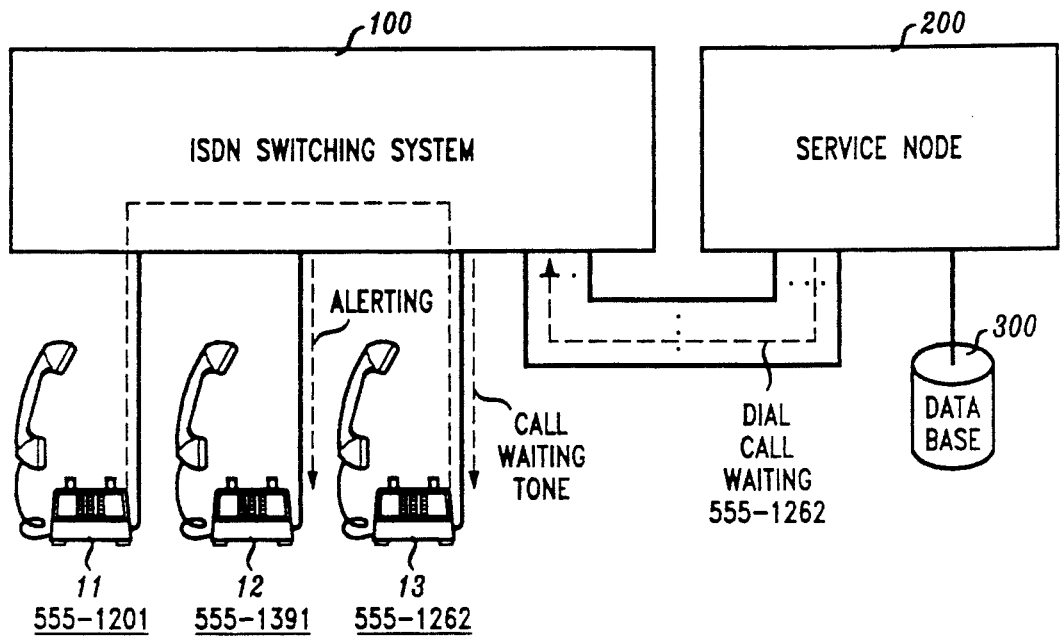

The directory number (DN) 555-1262 is dialed at station 11 to call station 13. (The calling station 11 is in this example served by the same switching system 100 as the called station; this is not necessary.) Station 13 goes off-hook and system 100 completes a communication path between stations 11 and 13 (FIG. 2). The DN 555-1262 is then dialed at station 12. Since station 13 is busy, the incoming call is forwarded to service node 200 and the calling DN 555-1391 (CLID) is provided to service node 200. An audible alerting signal is transmitted from system 100 to station 12 (FIG. 3). Service node 200 accepts the forwarded call and causes a search to be made in database 300 to find a calling party name associated with the calling DN 555-1391. Service node 200 then invokes a dial call waiting feature of system 100 by dialing a special feature activation code followed by the DN 555-1262. There is no need for station 13 to have multiple DNs per line. Dial call waiting is a call waiting-originating feature wherein call waiting is applied to a terminating station at the request of an originating station. Dial call waiting has precedence over call forwarding-busy line which is assigned to station 13. A call waiting tone is transmitted from system 100 to station 13 (FIG. 4).

Figure 5:
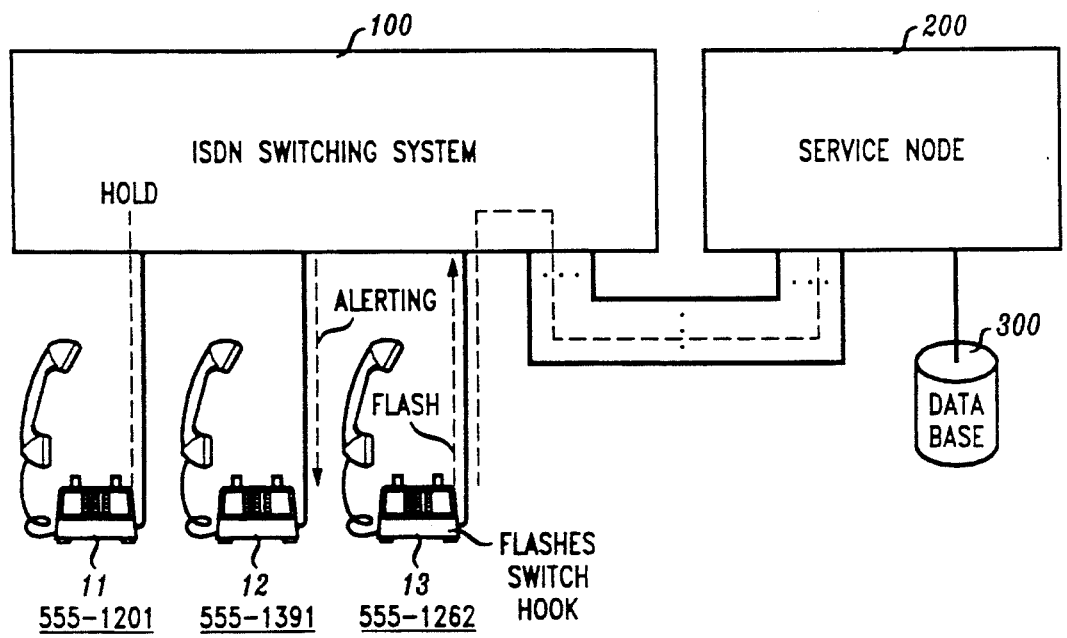

The switch-hook at station 13 is flashed in response to the call waiting tone (FIG. 5). System 100 responds to the flash signal by placing the call from station 11 on hold and completing a communication path between station 13 and service node 200. Service node 200 then transmits the calling party name and a menu to station 13 using text-to-speech (TTS) service circuits 230 (FIG. 6). The menu includes a number of call handling options: (1) transfer the call to a voice message system, (2) place the call on hold, (3) transmit a busy message to the caller, (4) have system 100 continue to transmit an audible alerting signal to the caller, or (5) accept the call. A customer at station 13 specifies an option by dialing a corresponding dual tone multi-frequency (DTMF) digit. When the customer specifies call acceptance, a communication path is established through system 100 between stations 12 and 13 (FIG. 7). Alternatively, the prespecified signal indicating call acceptance could be expiration of a predetermined time period without receiving signaling from station 13.

The call forwarding-busy line feature may be cancelled on a per call basis. A customer at station 13 dials a code to cancel call forwarding-busy line and receives a confirmation tone followed by a dial tone. The customer then calls a DN of a computer or other desired destination. Anyone calling station 13 receives a busy signal from system 100; the call is not forwarded to service node 200. Once station 13 returns to on-hook, the call forwarding-busy line feature is back in effect.

In order to enable use of system 100 in the manner described, system 100 must be configured as follows: 1) service node 200 must subscribe to an unrestricted terminal group with a number between 1 and 65K, and must subscribe to dial call waiting with a prespecified feature activation code, and 2) station 13 must subscribe to the same unrestricted terminal group as service node 200, and must subscribe to call forwarding-busy line with calls forwarded to service node 200 but with only two calls forwarded at the same time.

Figure 8:
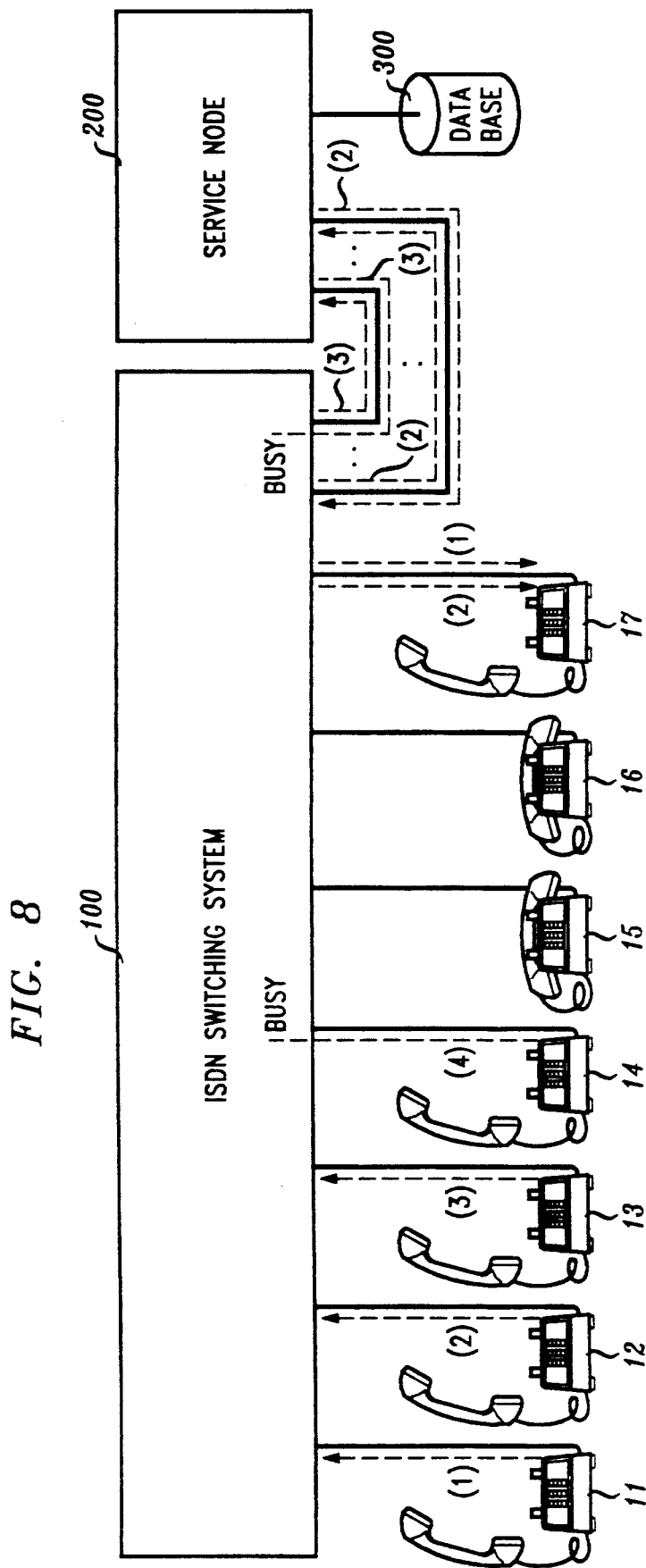
FIGS. 8–9 are diagrams illustrating a scenario including two cases where two calls are forwarded to the service node of FIG. 1 at the same time.
Figure 9:
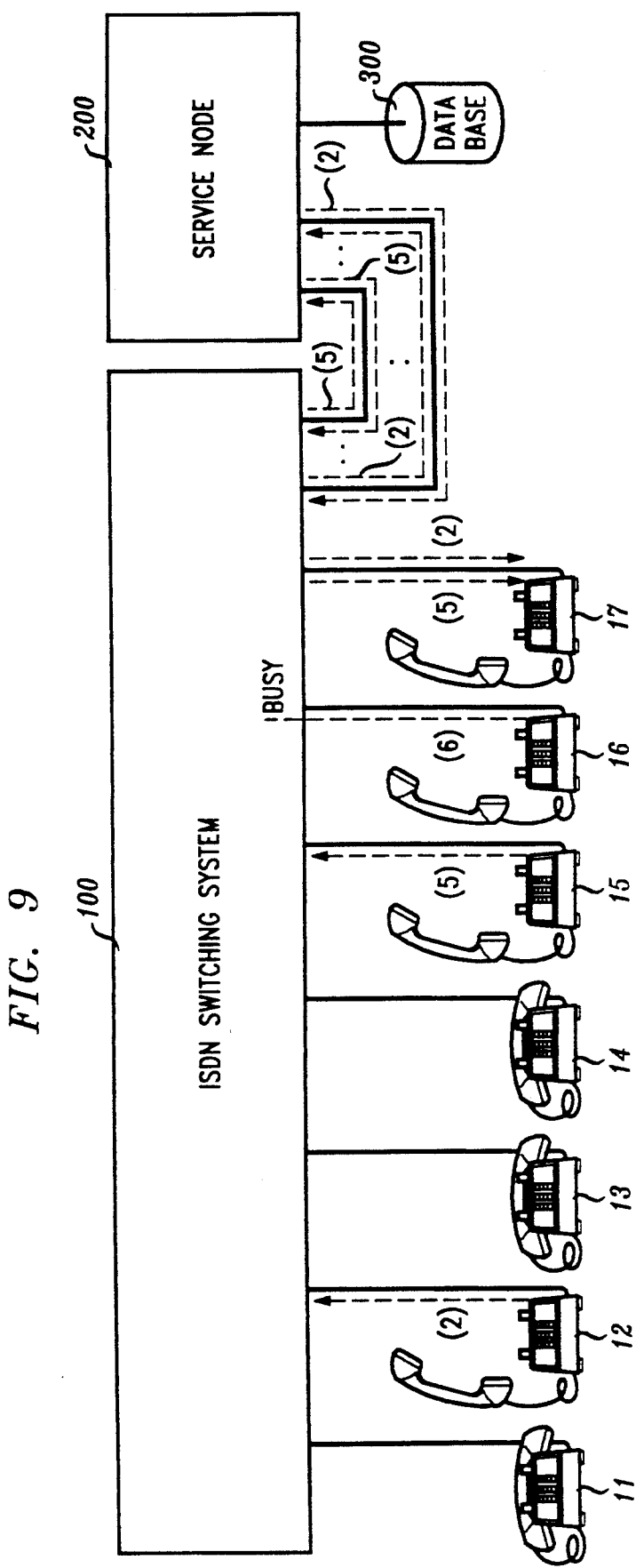

FIGS. 8 and 9 illustrate the operation of the feature of the present invention with two calls forwarded at the same time. Call 1 is completed between stations 11 and 17 (FIG. 8). Call 2 from station 12 is forwarded to service node 200 and the calling party name and menu are subsequently transmitted to station 17. Call 3 from station 13 is forwarded to service node 200 but receives busy from switching system 100 when service node 200 attempts to invoke the dial call waiting feature. Dial call waiting can be invoked for only one call. Call 4 from station 14 receives busy from system 100 because two calls are already forwarded. Calls 1, 3 and 4 are all discontinued.

Call 5 from station 15 is forwarded to service node 200 and the calling party name and menu are subsequently transmitted to station 17 (FIG. 9). Call 6 from station 16 receives busy from system 100 because two calls are currently forwarded.

It is to be understood that the above-described embodiment is merely illustrative of the principles of the invention and that many variations may be devised by those skilled in the art without departing from the spirit and scope of the invention. It is therefore intended that such variations be included within the scope of the claims.

We claim:

1. In an arrangement comprising a switching system and a service node for specialized call processing, a method comprising in response to an incoming call from a calling communication station to said switching system for a called communication station having a given directory number and having a call forwarding-busy line feature assigned to it by said switching system, determining whether said called station is busy on another call, upon determining that said called station is busy on another call, forwarding said incoming call to said service node in accordance with said call forwarding-busy line feature, in response to said forwarded incoming call, said service node effecting a search for information associated with said calling station, said service node causing a call waiting signal to be transmitted to said called station by invoking a call waiting-originating feature of said switching system and dialing said given directory number, where said call waiting-originating feature takes precedence over said call forwarding-busy line feature, after said call waiting signal is transmitted and in response to receipt of a predefined signal from said called station, said switching system disconnecting a communication path between a calling communication station for said another call and said called station, and after said communication path is disconnected, said service node transmitting speech signals, generated from said information obtained during said search, to said called station.

2. A method in accordance with claim 1 further comprising after said speech signals are transmitted and in response to receipt of a prespecified signal from said called station, said service node transferring said incoming call to said called station.

3. A method in accordance with claim 1 wherein said called station has a call waiting deluxe feature assigned to it by said service node.

4. A method in accordance with claim 1 wherein said call forwarding-busy line feature may be canceled on a per call basis.

5. A method in accordance with claim 1 further comprising during said determining, forwarding, effecting, causing, disconnecting and transmitting steps, transmitting an audible alerting signal to said first-mentioned calling station.

6. A method in accordance with claim 1 further comprising upon determining that said called station is not busy, completing said incoming call to said called station without forwarding said incoming call to said service node.

7. A method in accordance with claim 1 wherein said call waiting-originating feature is a dial call waiting feature.

8. A method in accordance with claim 7 wherein at most two calls to said called station can be forwarded to said service node at the same time.

9. A method in accordance with claim 8 wherein said dial call waiting feature of said switching system may be invoked for only one call to said called station at a time.

10. A method in accordance with claim 1 further comprising after said communication path is disconnected, said service node transmitting to said called station an announcement comprising a number of call handling options.

11. A method in accordance with claim 10 further comprising after said communication path is disconnected and in response to receipt of a signal from said called station defining one of said options, said service node controlling handling of said incoming call in accordance with said defined option.

12. A method in accordance with claim 11 wherein said defined option comprises transferring said incoming call to a voice message system.

13. A method in accordance with claim 11 wherein said defined option comprises placing said incoming call on hold.

14. A method in accordance with claim 11 wherein said defined option comprises transmitting a busy signal to said first-mentioned calling station.

15. A method in accordance with claim 11 wherein said defined option comprises having said system continue to transmit an audible alerting signal to said first-mentioned calling station.

16. A method in accordance with claim 11 wherein said defined option comprises said called station accepting said incoming call.

* * * * *